July 4, 1939.  D. W. BRANSKY  2,164,637
RECOVERY OF SULPHUR DIOXIDE FROM ACID SLUDGES
Filed Jan. 7, 1938

INVENTOR
David W. Bransky
BY Arthur H. Bransky
ATTORNEY

Patented July 4, 1939

2,164,637

UNITED STATES PATENT OFFICE 2,164,637

RECOVERY OF SULPHUR DIOXIDE FROM ACID SLUDGES

David W. Bransky, Chicago, Ill., assignor to Standard Oil Company, Chicago, Ill., a corporation of Indiana Application January 7, 1938, Serial No. 183,916

2 Claims. (Cl. 23—178)

This invention relates to improvements in the recovery of sulphuric acid from acid sludges and more particularly to improvements in the recovery of sulphur dioxide from gaseous products resulting from the decomposition of acid sludges.

Refining petroleum hydrocarbons with concentrated and/or fuming sulphuric acid produces an acid sludge which is separated from the oil by settling, centrifuging or other suitable means. This acid sludge is a complex mixture of acid, oil, asphaltic hydrocarbons and sulphuric acid products having an acid content of from about 20% to about 75% or more. The present invention is concerned with an improved method of recovering the acid from such sludges.

Acid sludges resulting from the treatment of petroleum oils with sulphuric acid and particularly the acid sludges resulting from the treatment of heavy petroleum oils such as lubricating oils with sulphuric acid may be processed to recover the acid therein by decomposing the sludges with heat, fractionating the gaseous products of decomposition to separate the sulphur dioxide therefrom and subsequently converting the sulphur dioxide to sulphur trioxide and producing sulphuric acid from the latter. The acid sludges may be decomposed by direct heating in a rotary kiln in the manner described in U. S. Patent 1,953,225 or by contact with heated solid material as described in U. S. Patent 2,028,713, whereby the sulphuric acid in the sludge is reduced to sulphur dioxide by the hydrocarbons present in the sludge. The gaseous products evolved from the decomposition of the sludges comprise water vapors, vaporized hydrocarbons and gaseous sulphur dioxide. Before the sulphur dioxide can be efficiently converted into sulphuric acid it is necessary to remove the water and hydrocarbon compounds in order to avoid dilution difficulties.

It is an object of the present invention to provide an efficient method of separating the sulphur dioxide from the other undesired gaseous products obtained by the decomposition of acid sludge.

It is another object of the present invention to provide a method of obtaining substantially pure sulphur dioxide from acid sludge.

Figure 1:
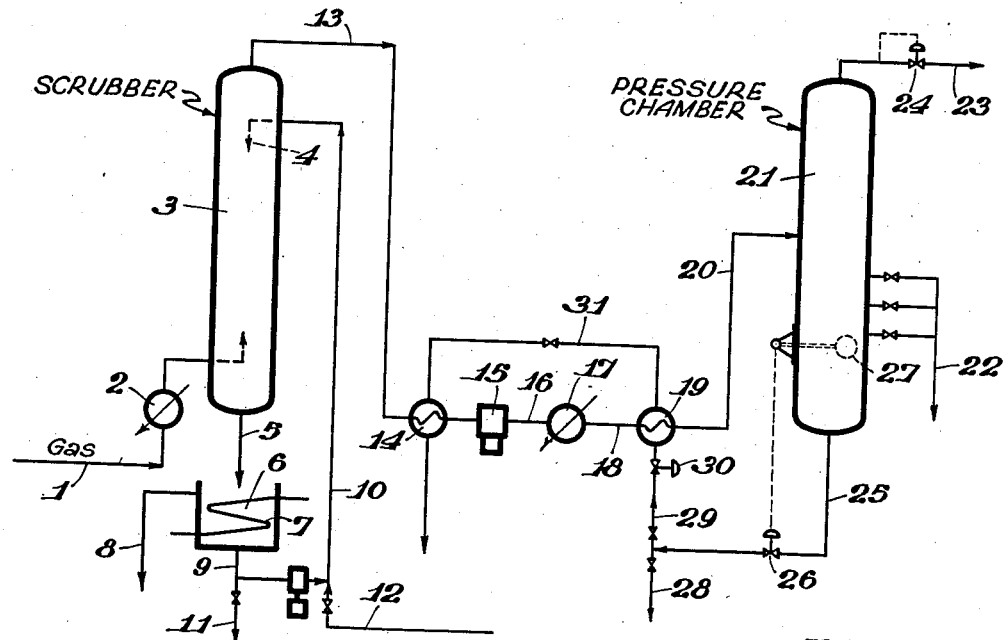
Figure 2:
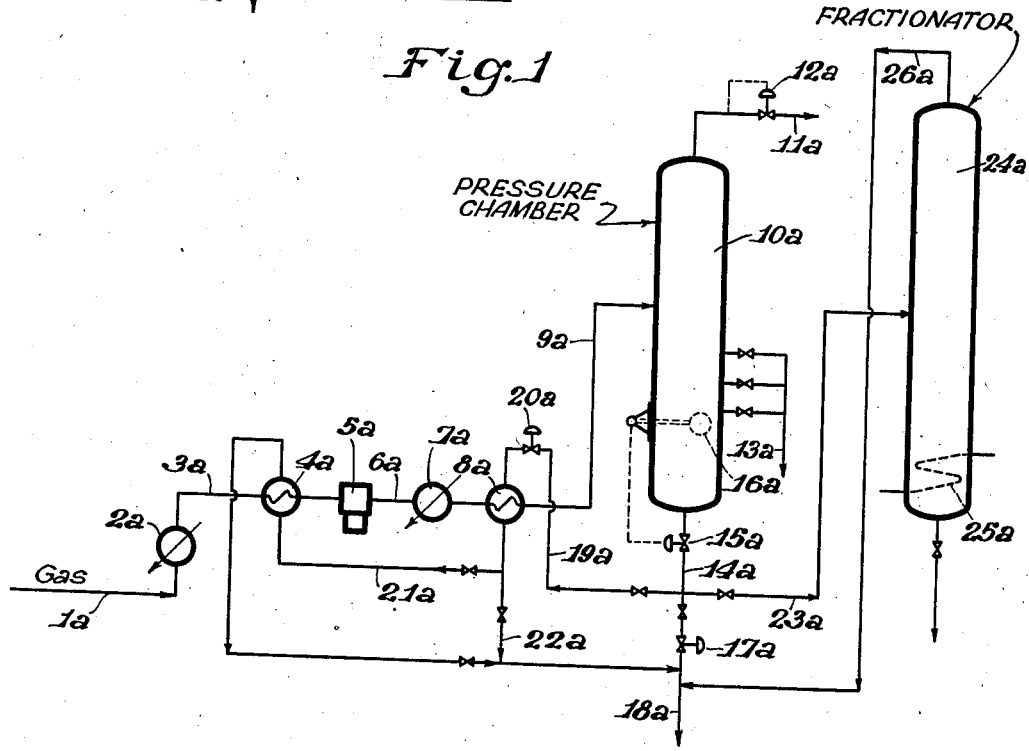

Other objects and advantages of the invention will become apparent from the following description thereof read in conjunction with the accompanying drawing in which:

Figure 1 is a schematic flow diagram of a preferred method of carrying out the invention, and Figure 2 is a schematic flow diagram of a modified method of carrying out the invention.

Briefly stated, the invention comprises decomposing acid sludge, removing condensible hydrocarbons, water and dust from the gases evolved from such decomposition, compressing the gaseous sulphur dioxide and the uncondensible vapors, and subsequently liquefying the sulphur dioxide and separating the same from the gaseous uncondensible hydrocarbons and other gases.

My invention may be readily understood from the following description which is merely illustrative of the same and not to be considered as a limitation thereof. Referring to Figure 1 gaseous products containing about 25% sulphur dioxide, with hydrocarbons and other products resulting from the decomposition of acid sludge by any suitable method such as, for example, the methods described in U. S. Patents Nos. 1,953,225 and 2,028,713, after being freed of entrained dust by suitable means, are passed through a line 1 and a cooler 2 into the bottom of a scrubbing tower 3 wherein the cooled gaseous products are brought into countercurrent contact with water at a temperature of about 50–70° F., descending in the tower from a suitable spray head 4. The condensible hydrocarbons in the gaseous product from the sludge decomposer are condensed in the scrubbing tower 3 by contact with the descending water spray, and are removed together with the water from the scrubber 3 through a withdrawal line 5. The liquid effluent from the scrubbing tower 3 is introduced into a separator tank 6 wherein the oil and water mixture separates into an upper oil layer and a lower water layer. The water in the separator 6 may be cooled by suitable means, such as a cooling coil 7. The oil is removed from the separator through a line 8 and the water withdrawn from the separator through a line 9 and recycled to the scrubbing tower 3 through a line 10. When necessary the wash water may be passed to the sewer through a line 11. Fresh or make-up water may be introduced through a valved line 12 which may be connected with the line 10 leading to the scrubbing tower 3.

Sulphur dioxide is soluble to some extent in cold water and unless the wash water is recycled the sulphur dioxide loss would be too great. In place of using water in the scrubbing tower we may use sulphuric acid of about 50–60% strength which, under some conditions, is more effective as a scrubbing medium to remove dust, condensible hydrocarbons and other hydrocarbons absorbable in sulphuric acid. While I have shown only one scrubbing tower, it is to be understood that a plurality of such scrubbing towers may be used in series in which the wash water is recycled countercurrent to the flow of gases with withdrawal of wash water to the sewer from the hottest tower so that loss of dissolved $SO_2$ in the water may be reduced to a minimum.

The uncondensed products comprising uncondensible hydrocarbon vapors and sulphur dioxide vapors are withdrawn from the top of the scrubbing tower 3 through a line 13 and passed through a heat exchanger 14 wherein the gases are further cooled by expanded $SO_2$ as hereinafter described, to a compressor 15 wherein the gases at a temperature of about 65-100° F. are compressed to about 3-10 atmospheres pressure, and the compressed gases passed from the compressor 15 through a line 16 to an indirect water cooler 17 wherein the gases are further cooled. The cooled gases are then passed through a line 18 through a heat exchanger 19 wherein the compressed gases are still further cooled by suitable means as such by the expansion of liquefied $SO_2$ as hereinafter described. From the heat exchanger 19 the cooled gases pass through a line 20 to a pressure chamber 21 maintained under about 3-10 atmospheres of pressure wherein separation of the liquefied sulphur dioxide takes place. Under certain conditions if all of the condensible hydrocarbons are not removed in the scrubbing tower they may be liquefied in the pressure chamber 21 and withdrawn from the system through a manifolded discharge line 22. The uncondensible gases which include carbon monoxide, methane, etc., are withdrawn from the pressure chamber 21 through a line 23 by means of the pressure release valve 24.

The liquefied sulphur dioxide is removed from the pressure chamber 21 through a withdrawal line 25 in which is located a float controlled valve 26 actuated by the float 27 in chamber 21. If desired a portion of the liquefied $SO_2$ may be passed through a valved line 28 to the acid contact plant (not shown) to be therein converted to sulphuric acid. Preferably the liquefied sulphur dioxide from the pressure chamber 21 is used as the cooling medium in the exchanger 19 by introducing the same through a line 29 and an expansion valve 30. The sulphur dioxide which has been vaporized in the heat exchanger 19 to provide cooling therein is withdrawn from the exchanger through a valved line 31 and introduced into the heat exchanger 14 to further cool the gases leaving the scrubber 3 through the line 13 just before the same pass into the compressor 15. The expanded $SO_2$ gases from the exchanger 14 may be passed to the acid contact plant and combined with the $SO_2$ leaving the system through the line 28.

The liquefied $SO_2$ withdrawn from the pressure chamber 21 will be in most cases substantially free of hydrocarbons or will contain so little hydrocarbons that bad results from excessive dilution will not be experienced in the conversion to sulphuric acid. Under certain conditions when the hydrocarbon content is above that conducive to successful conversion of $SO_2$ to sulphuric acid, the sulphur dioxide containing the small amounts of hydrocarbons may be freed of the same by means of selective fractionation or by means of a water wash and the sulphur dioxide subsequently recovered in a suitable stripping tower such as, for example, by passing the sulphur dioxide liquor through a packed tower countercurrent to an ascending stream of air, and drying before being processed to sulphuric acid.

Instead of removing the condensible hydrocarbons in the scrubbing tower 3 and subsequently compressing and liquefying the $SO_2$ as aforestated, the process may be modified by cooling the dust-freed gases from the sludge coker, compressing and liquefying the cooled gases and subsequently passing the liquefied hydrocarbons and $SO_2$ to a pressure chamber, wherein a liquid phase separation is effected and the liquefied $SO_2$ and liquefied hydrocarbons separately recoverd in the manner shown in Figure 2.

Referring to Figure 2 gaseous products containing sulphur dioxide, hydrocarbons and other products resulting from the decomposition of acid sludge after being freed of entrained dust, etc., are passed through a line 1a, a cooler 2a and a line 3a and a heat exchanger 4a wherein the gases are further cooled by gaseous $SO_2$, as hereinafter described, to a compressor 5a wherein the cooled gases are compressed to a pressure of about 3-10 atmospheres. From the compressor 5a the compressed gases pass through line 6a and a cooler 7a to a heat exchanger 8a wherein the compressed gases are cooled by suitable means, such as, for example, by the expansion of liquefied $SO_2$, as hereinafter described. From the heat exchanger 8a the cooled gases pass through a line 9a to a pressure chamber 10a wherein separation of the liquefied sulphur dioxide and substantially all of the liquefied hydrocarbons takes place. The uncondensible gases, which include carbon monoxide, methane, etc., are withdrawn from the pressure chamber 10a through a line 11a by means of a pressure release valve 12a. The liquefied hydrocarbons are withdrawn from the pressure chamber 10a through a manifolded discharge line 13a.

The liquefied sulphur dioxide is removed from the pressure chamber 10a through a withdrawal line 14a in which is located a float control valve 15a actuated by the float 16a. If desired a portion of the liquefied $SO_2$ may be expanded through an expansion valve 17a and sent through a line 18a to the acid contact plant (not shown) to be therein converted to sulphuric acid. Preferably the liquefied sulphur dioxide from the pressure chamber 10a is used as a cooling medium in the heat exchanger 8a by introducing the same through a line 19a and an expansion valve 20a. The reduction in pressure vaporizes the sulphur dioxide to provide cooling in the heat exchanger 8a. Gaseous sulphur dioxide is withdrawn from the exchanger through a line 21a and introduced into the heat exchanger 4a to further cool the gases from the sludge coker just before the same pass into the compressor 5a. Instead of passing the $SO_2$ gases from the heat exchanger 8a to the exchanger 4a, the same may be withdrawn through a valved line 22a which is joined with the line 18a and combined with the $SO_2$ from the pressure chamber 10a.

Under most conditions the liquefied sulphur dioxide withdrawn from pressure vessel 10a will be substantially free of hydrocarbons. However, in the event the liquefied $SO_2$ from the pressure vessel contains an amount of hydrocarbons detrimental to the successful operation of the acid contact plant, it may be necessary to further purify the $SO_2$ to remove therefrom the condensed hydrocarbons. This may be accomplished by selective fractionation of the liquefied products from the pressure chamber 10a, for example, heating the same to a temperature of about 110° F. to 130° F. at which temperature the sulfur dioxide will be distilled from the mixture as diagrammatically shown in Figure 2.

Referring further to Figure 2, the liquefied sulphur dioxide from the pressure chamber 10a is passed through a withdrawal line 14a and a valved line 23a to a fractionator 24a provided with heating means, such as a steam coil 25a in the bottom portion thereof. The fractionator 24a like the pressure chamber 10a is maintained under a pressure between about 3 and 10 atmospheres. By means of the heat supplied by the steam coil 25a the temperature within the fractionator 24a is raised to a temperature between about 110° F. and 130° F. at which temperature the liquefied $SO_2$ is removed as a distillate from the fractionator 24a leaving behind the higher boiling undesirable hydrocarbons. The sulphur dioxide is removed from the fractionator 24a through a valved line 26a, which may be hooked-up with the line 18a, and sent to the acid contact plant.

An alternative method of removing the last traces of hydrocarbons from the $SO_2$ comprises reducing the pressure on the liquefied product from the pressure chamber 10a and contacting the gases with cooled water in a suitable scrubber to condense the hydrocarbons. After the condensed hydrocarbons are separated from the condensing water, the latter may be heated to recover the sulphur dioxide in solution in the water. The $SO_2$ gas may then be dried by suitable means and sent to the acid contact plant.

While I have described the invention as applied to the purification of sulphur dioxide obtained by the decomposition of acid sludge resulting from the sulfuric acid treatment of petroleum hydrocarbons it is not limited to such sludges but is applicable to the purification of sulphur dioxide resulting from the decomposition of any sulphuric acid sludge resulting from the treatment of any carbonaceous material with sulphuric acid.

I claim:

1. In the process of recovering sulphur dioxide from acid sludge wherein the acid sludge is decomposed by coking and a gas mixture comprising sulphur dioxide, gaseous condensible hydrocarbons, and non-condensible constituents is obtained, the improvement in effecting the separation of sulphur dioxide from said gas mixture which comprises removing entrained solid carbonaceous material from the gas mixture, cooling the gas mixture, introducing the cooled gas mixture into a scrubbing tower wherein the ascending gas mixture is countercurrently contacted with a cool aqueous medium whereby the condensible gaseous hydrocarbons are condensed and removed with the cooling aqueous medium from the scrubbing tower, passing the gas mixture from the scrubbing tower through a first heat exchanger to effect the cooling thereof, compressing the cooled gas mixture, passing the compressed gas mixture through a second heat exchanger to further cool the same, introducing the cooled compressed gas mixture into a pressure chamber wherein the mixture separates into a bottom layer comprising liquefied sulphur dioxide and a minor portion of liquid hydrocarbons and an upper layer of substantially pure liquid hydrocarbons, removing the uncondensible gas from said pressure chamber, separately removing from said pressure chamber the upper layer of substantially pure liquid hydrocarbons and the bottom layer comprising liquefied sulphur dioxide and a minor portion of liquid hydrocarbons, expanding a small portion of the sulphur dioxide layer in said heat exchangers to effect the cooling of the gases therein, passing the major portion of the sulphur dioxide layer to a fractionator wherein the liquefied sulphur dioxide and liquid hydrocarbon mixture is heated to fractionate the sulphur dioxide from the undesired hydrocarbons, and removing the sulphur dioxide as a distillate from the fractionator whereby substantially pure sulphur dioxide is obtained.

2. The process as described in claim 1 in which the sulphur dioxide and hydrocarbon mixture in the fractionator is heated to a temperature of from about 110° F. to about 130° F. to effect separation of the sulphur dioxide from the undesired hydrocarbons.

DAVID W. BRANSKY.